(12) United States Patent
Levinberg

(10) Patent No.: US 7,327,989 B2
(45) Date of Patent: Feb. 5, 2008

(54) DUAL CHANNEL TWO-WAY SATELLITE COMMUNICATION

(75) Inventor: Amiram Levinberg, Ramat Gan (IL)

(73) Assignee: Gilat Satellite Networks, Inc., McLean, VA (US)

( * ) Notice: Subject to any disclaimer, the term of this patent is extended or adjusted under 35 U.S.C. 154(b) by 193 days.

(21) Appl. No.: 10/235,678

(22) Filed: Sep. 6, 2002

(65) Prior Publication Data

US 2003/0060196 A1   Mar. 27, 2003

Related U.S. Application Data

(60) Provisional application No. 60/317,148, filed on Sep. 6, 2001.

(51) Int. Cl.
*H04B 1/034*     (2006.01)
(52) U.S. Cl. .............. 455/98; 455/11.1; 455/12.1; 455/427
(58) Field of Classification Search ............ 455/428, 455/450, 3.02, 427, 13.2, 454, 431, 430, 455/12.1, 98, 43.2, 460; 370/316; 725/64, 725/68, 76, 75
See application file for complete search history.

(56) References Cited

U.S. PATENT DOCUMENTS

| 4,742,512 | A |   | 5/1988  | Akashi et al. |
| 4,901,313 | A |   | 2/1990  | Fujikura et al. |
| 5,003,534 | A | * | 3/1991  | Gerhardt et al. ............ 370/322 |
| 5,053,782 | A |   | 10/1991 | Levinberg et al. |
| 5,702,070 | A | * | 12/1997 | Waid ........................... 244/183 |
| 6,038,594 | A |   | 3/2000  | Puente et al. |
| 6,201,961 | B1 | * | 3/2001 | Schindall et al. ........... 455/430 |
| 6,208,307 | B1 | * | 3/2001 | Frisco et al. ................ 343/757 |
| 6,233,429 | B1 |   | 5/2001 | Soffer et al. |
| 6,240,073 | B1 | * | 5/2001 | Reichman et al. .......... 370/319 |
| 6,266,339 | B1 |   | 7/2001 | Donahue et al. |
| 6,381,227 | B1 | * | 4/2002 | Fielding et al. ............. 370/321 |
| 6,441,782 | B2 |   | 8/2002 | Kelly et al. |
| 6,658,463 | B1 | * | 12/2003 | Dillon et al. ............... 709/219 |
| 6,711,398 | B1 | * | 3/2004 | Talaie et al. ................ 455/403 |
| 2002/0009060 | A1 | * | 1/2002 | Gross ......................... 370/321 |
| 2002/0069416 | A1 | * | 6/2002 | Stiles ........................... 725/63 |
| 2002/0105976 | A1 | * | 8/2002 | Kelly et al. ................. 370/519 |
| 2002/0164948 | A1 | * | 11/2002 | Parkman .................... 455/13.1 |
| 2002/0170060 | A1 | * | 11/2002 | Lyman ......................... 725/73 |
| 2002/0199200 | A1 | * | 12/2002 | Addington .................... 725/97 |
| 2003/0028893 | A1 | * | 2/2003 | Addington .................. 725/115 |
| 2003/0043760 | A1 | * | 3/2003 | Taylor ........................ 370/316 |
| 2004/0042479 | A1 | * | 3/2004 | Epstein et al. ............. 370/432 |

FOREIGN PATENT DOCUMENTS

WO     WO 98/29724     5/1988

OTHER PUBLICATIONS

EP 02 76 8801, Supplemental European Search Report, dated Aug. 8, 2006.

\* cited by examiner

*Primary Examiner*—Duc M. Nguyen
*Assistant Examiner*—Dai Phuong
(74) *Attorney, Agent, or Firm*—Banner & Witcoff, Ltd.

(57) ABSTRACT

The present invention relates to a system, device and method for two-way satellite communication using a dual channel communication configuration to make better use of limited bandwidth. The two channels include a dedicated Unicast channel for each remote VSAT terminal and a dedicated Multicast channel that is a shared resource for all the VSAT terminals in the network. Each VSAT terminal is provided with two separate tuners, one for Unicast information and one for Multicast information. The system thus provides Unicast information through the Unicast channel to the Unicast receiver in the VSAT terminal to individual destination VSAT terminals, and sends Multicast information to all VSAT terminals via the Unicast channel and the Unicast receivers in each VSAT terminal.

6 Claims, 3 Drawing Sheets

DUAL CHANNEL TWO-WAY SATELLITE COMMUNICATION

This application claims the benefit of U.S. Provisional Application 60/317,148, filed Sep. 6, 2001, which is incorporated herein in its entirety.

FIELD OF THE INVENTION

The present invention relates to a dual channel receiver for a two-way satellite communication system and a method of two-way communication between a hub and remote terminals using dual channels. More particularly, the system receiver and method utilize a dual channel configuration to make better use of limited bandwidth.

BACKGROUND OF THE INVENTION

A two-way satellite communication system of VSAT (very small aperture terminal) type consists of a central hub and a large number of terminals. These terminals are typically spread over a large area—this area can be as large as a continent. In such a configuration, each one of the remote (VSAT) terminals is in two-way communication with the hub through a satellite. The architecture of such a VSAT based system is disclosed in U.S. Pat. Nos. 6,233,429 (Soffer et al.), for a VSAT Satellite Communication System, and 5,053,782 (Levinberg et al.), for a Commercial Satellite Communication System, which are assigned to Gilat, the Assignee of the present invention, and which are incorporated herein by reference.

In the satellite communication systems described in the Soffer et al. and Levinberg et al. patents, the data service transmitted outbound from the central hub to each one of the remote terminals can be one of two different types:

(a) a Unicast connection, in which data is sent from the hub to each VSAT terminal separately, as part of a private session between the hub and each specific terminal, and (b) a Multicast connection, in which data is sent (broadcasted) from the hub to groups of VSAT terminals, each group consists of any number of VSAT terminals, and all the VSAT terminals in a group receive the same Multicast information.

Satellite bandwidth is a major resource that is used by the VSAT network described in the Soffer et al. and Levinberg et al. systems. Normally such a network has a pre-assigned bandwidth in the satellite for both of the transmit directions, i.e., inbound—from the VSAT terminals to the hub, and outbound—from the hub to the VSAT terminals) and for both types of services (Unicast and Multicast). Because the satellite bandwidth resources are limited, bandwidth management is highly important for large networks. Satellite-based communications systems consist of several "channels", each of which covers a certain frequency band. Normally, but not necessarily, each channel is attributed to and works through a transponder in the satellite. The overall bandwidth capacity of the satellite is determined by the frequency band of each channel multiplied by the number of available channels or transponders. In a typical large network, the VSAT terminals are divided between transponders, such that each transponder serves a group of VSAT terminals.

There is no relation between the partitioning of VSAT terminals into channels, and the definition of VSAT terminal groups for Multicast broadcasting. The VSAT terminals that are tuned to different channels may or may not be assigned to the same Multicast group for a specific broadcast. In order to enable each VSAT terminal in the system to receive the Multicast transmissions, regardless of the channel it is tuned to, the same Multicast information has to be transmitted on each channel, in addition to the Unicast information. FIG. 2 illustrates this schema.

As shown in FIG. 1, the system 5 includes a satellite 18, multiple remote sites 10, each having a very small aperture antenna 14, and a hub site 20. The remote sites 10 include VSAT terminals VSAT 1 through VSAT m, as shown in FIG. 2. Each VSAT terminal has a single receiver. In the illustrated example shown in FIG. 2, the satellite 18 communicates with VSAT terminals via Channel 1 through Channel n. Each VSAT terminal 10 receives both Unicast and Multicast data via its assigned channel. As a result, in order to communicate Multicast data to the VSAT terminals 10, the satellite 18 must broadcast the data over all of the channels, Channel 1 through Channel n. Such broadcasting makes very inefficient use of the available bandwidth.

This duplication of Multicast information over all the channels 1 through n in the satellite 18 imposes a significant inefficiency of bandwidth utilization. Since the bandwidth in a satellite communication network 5 is an expensive resource, this inefficiency has a major cost impact on the whole VSAT network and the price, which consumers of such a product need to pay.

Thus, there exists a need in the art for a method, device, and system, which makes more efficient use of the available bandwidth for Unicast and Multicast information transmission.

SUMMARY OF THE INVENTION

The present invention relates to a method, system and device that employs a dual channel communication configuration to make better use of limited bandwidth. Instead of duplicating the transmission of Multicast information through all channels, a separate special channel is assigned only to Multicast data.

In an embodiment of the present invention, a special channel is assigned for the transmission of only Multicast data. Each VSAT terminal is provided with two receivers instead of a single receiver. One receiver is a Unicast receiver that is tuned to a Unicast channel to which the VSAT terminal is assigned. The second receiver is a Multicast receiver that is tuned to the Multicast channel. The Multicast channel is a shared resource for the entire network.

The system can thus provide Unicast information through the Unicast channel and the Unicast receiver in the VSAT terminal to individual destination VSAT terminals, and can send Multicast information to all VSAT terminals or Groups of VSAT terminals via the Multicast channel and the Multicast receivers in each VSAT terminal.

The present invention is further drawn to a VSAT terminal for receiving Unicast information and Multicast information from a satellite on separate dedicated receivers and over separate Unicast and Multicast channels.

The present invention is further drawn to a method for transmitting information from a satellite to remote VSAT terminals. The method involves sending Unicast information and Multicast information via separate Unicast and Multicast channels from the satellite to the VSAT terminals where the information is received by separate dedicated Unicast and Multicast receivers.

BRIEF DESCRIPTION OF THE DRAWINGS

The foregoing summary and a better understanding of the present invention will become apparent from the following detailed description of representative embodiments and the claims when read in connection with the accompanying drawings, all forming a part of the disclosure of this invention. While the foregoing summary and following written disclosure focus on disclosing representative embodiments of this invention, it should be clearly understood that the same is by way of illustration and example only and the invention is not limited thereto. The spirit and scope of the present invention are limited only by the terms of the appended claims.

DETAILED DESCRIPTION OF THE INVENTION

Figure 1:
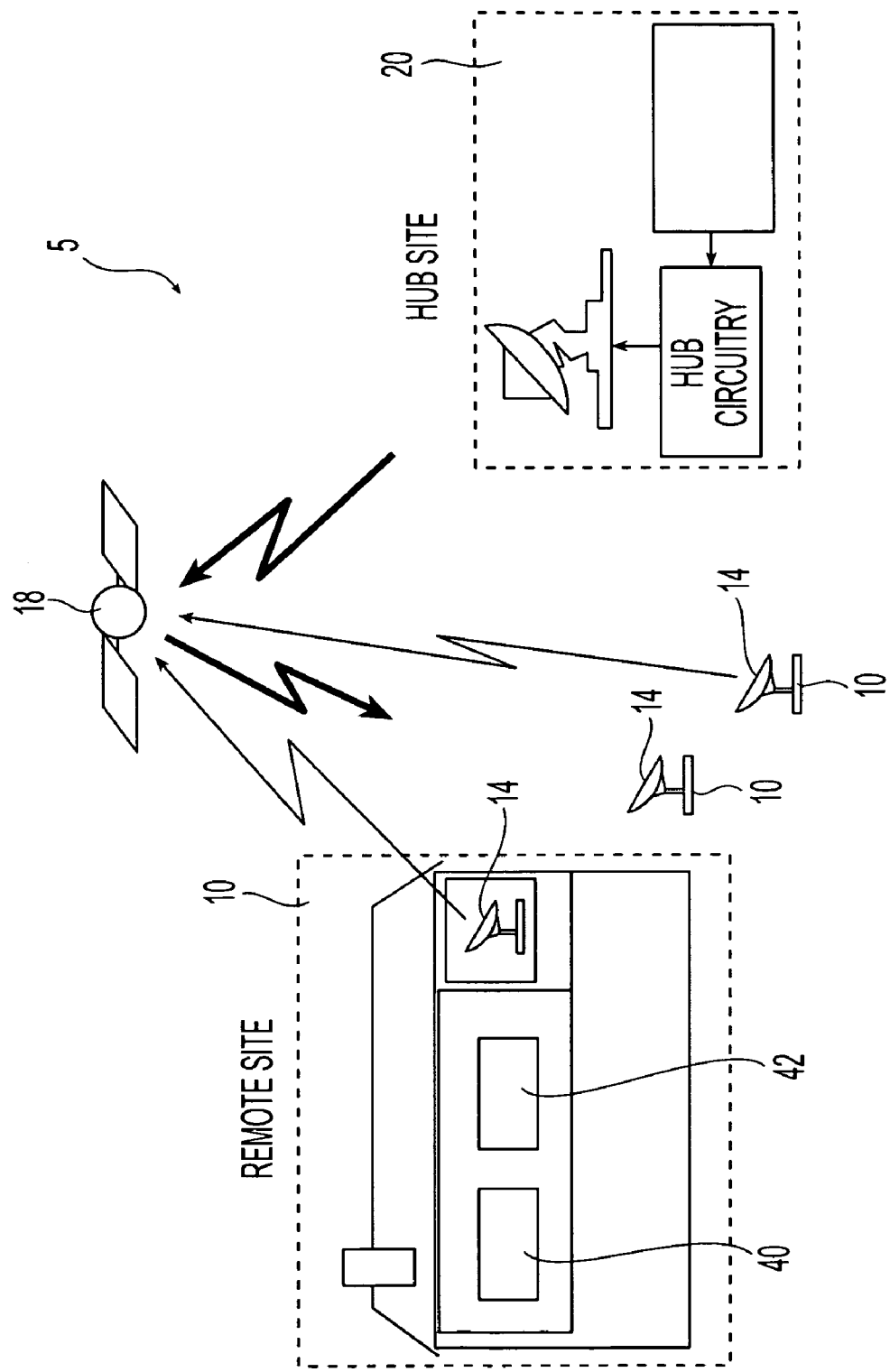
FIG. 1 illustrates a satellite communication system including a hub site, multiple remote sites and a satellite, according to the present invention.
Figure 2:
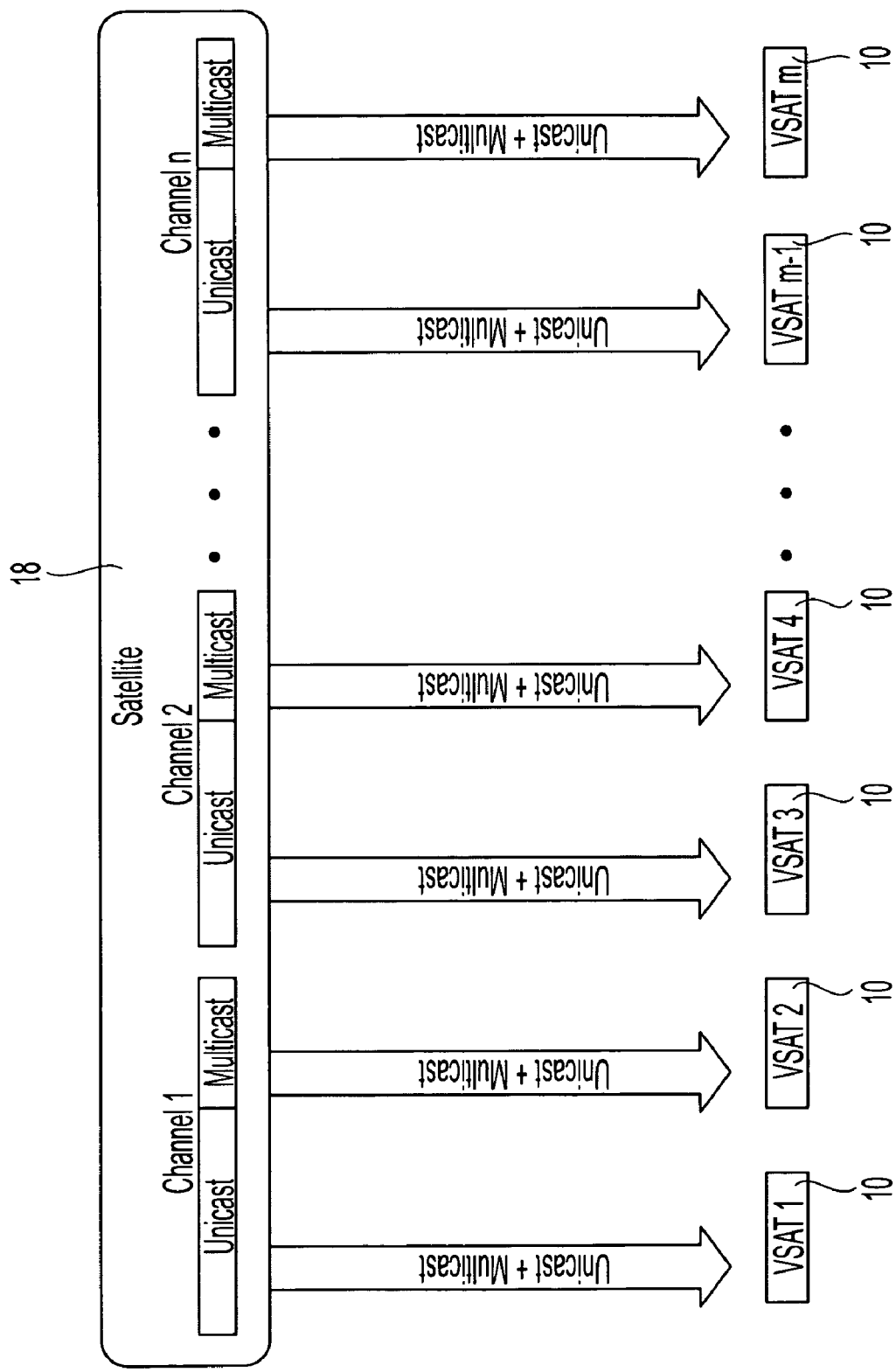
FIG. 2 illustrates conventional channel allocation for Unicast and Multicast communication from a satellite to multiple remote VSAT terminals.

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

The present invention relates to a method, device, and system for dual channel communication between a satellite and remote VSAT terminals. In addition to being capable of receiving Unicast transmissions, the VSAT terminals are enabled to receive Multicast transmissions via a dedicated Multicast channel. By such a configuration, the Multicast information need not be transmitted on every channel in addition to the Unicast information to ensure that each VSAT terminal in the system can receive Multicast transmissions.

Each VSAT terminal is provided with two receivers, one for Unicast transmissions and a second for Multicast transmissions. Transmissions directed to a specific VSAT terminal are sent over that terminals Unicast channel and are received by the dedicated Unicast receiver in that terminal. Multicast transmissions directed to all VSAT terminals or a group of VSAT terminals are sent over the multicast channels for each of the destination terminals, and are received by their corresponding Multicast receivers.

As a result of the method of the present invention, the need to send Multicast transmissions to all the VSAT terminals on all of the channels in the system is eliminated. Thus, the bandwidth required to transmit Multicast information is reduced.

It is to be understood that the invention is not limited in its application to the details of construction, arrangement, composition of the components, and order or sequence of steps of operation or implementation, set forth in the following description, drawings, or examples. The invention is capable of other embodiments or of being practiced or carried out in various ways. Also, it is to be understood that the phraseology and terminology employed herein are for the purpose of description and should not be regarded as limiting.

Figure 3:
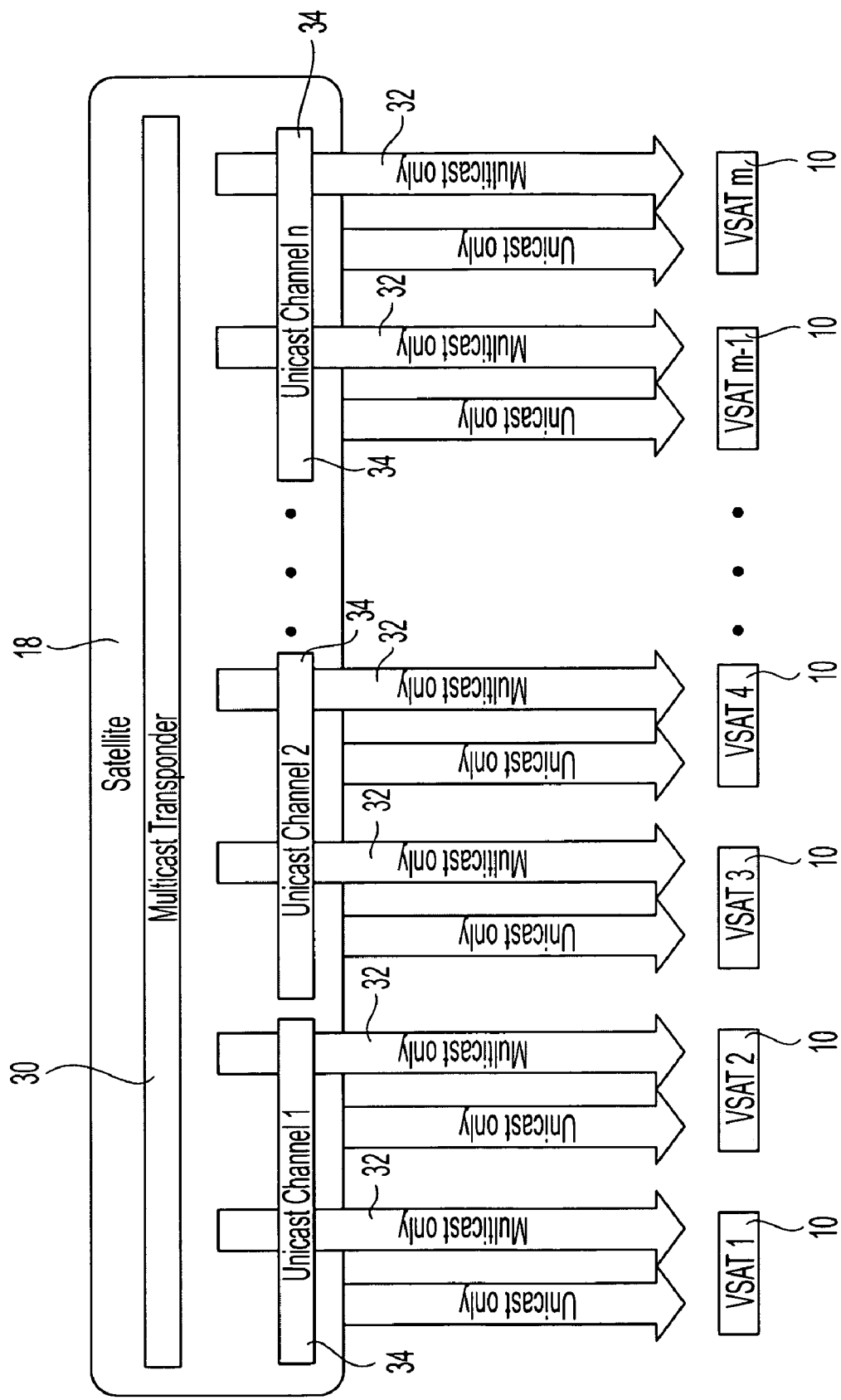
FIG. 3 illustrates channel allocation for Unicast and Multicast communication from a satellite to multiple remote VSAT terminals in accordance with the present invention.

Referring to FIG. 3, the channel allocation for Unicast and Multicast communication from a satellite 18 to multiple remote VSAT terminals 10 in accordance with the present invention is shown. In the illustrated embodiment of FIG. 3, the satellite 18 has a multicast transponder 30, which serves all of the VSAT terminals 10. In addition, the satellite 18 has multiple Unicast transponders, each serving one or more VSAT terminals 10.

Multicast Information transmissions are made from the Multicast transponder 30 to the VSAT transponders 10 via the Multicast channel 32. In FIG. 3, the Multicast channel 32 is connected to all of the 1-m VSAT terminals 10. The Unicast transponders in the satellite 18 transmit Unicast information via Unicast channels 34 numbered 1 through n. The illustrated embodiment shows two VSAT terminals 10 per each Unicast channel 34.

Referring to FIG. 1, each remote VSAT terminal 10 has a Unicast tuner 40 and a Multicast receiver 42. The Unicast receiver 40 is capable of receiving the Unicast transmissions from the satellite 18 over its Unicast channel 34. The Multicast receiver 42 receives the Multicast transmissions from the Multicast transponder 30 in the satellite 18 over the Multicast channel 32.

While the embodiment of FIG. 3 shows only a single Multicast transponder 30 in communication with all of the VSAT terminals 10, the satellite 18 may have multiple multicast transponders that communicate with groups of VSAT terminals 10. Furthermore, while the illustrated embodiment shows two VSAT terminals sharing a Unicast channel 34, more than two VSAT terminals, or only one VSAT terminal, may use a single Unicast channel 34.

According to the method of the present invention when a transmission is intended for one specific VSAT terminal 10, the satellite 18 sends the transmission to that VSAT terminal 10 via its assigned Unicast channel 34. The Unicast receiver 40 in the destination VSAT terminal 10 receives the Unicast transmission from the satellite 18.

When a transmission is intended for a group, or all of the VSAT terminals 10, the satellite sends the transmission from the Multicast transponder 30 via the Multicast channel 32 to the VSAT terminals 10. The Multicast receivers 42 in each VSAT terminal 10 receive the Multicast transmission from the satellite 18.

The system, device and method of the present invention set forth above overcomes the prior bandwidth problems by eliminating the duplication of the transmission of the Multicast information through all of the channels. Consequently, by assigning a special channel for only Multicast information, the satellite's bandwidth resources are used more efficiently.

The configuration of the present invention enables a much more efficient way to use the bandwidth of the satellite, and enables a significant cost reduction in the space segment requirement of the VSAT network. As a result, VSAT networks are suitable for very large consumer networks, such as for Internet access applications, with a relatively low space segment cost per subscriber.

Although the present invention has been described with reference to illustrative embodiments thereof, it should be understood that numerous other modifications and embodiments can be devised by those skilled in the art that will fall within the scope and spirit of the principles of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

What is claimed is:

1. A two-way VSAT satellite communication system comprising:

at least one satellite Multicast transponder and at least one satellite Unicast transponder;

a first fixed location VSAT terminal, having at least one Unicast receiver dedicated to receiving Unicast transmissions via at least one dedicated Unicast channel and at least one Multicast receiver dedicated to receiving Multicast transmissions via at least one dedicated Multicast channel co-located with the first fixed location VSAT terminal;

a second fixed location VSAT terminal, disposed at a remote location from the first fixed location VSAT terminal, having at least one Unicast receiver dedicated to receiving Unicast transmissions via at least one dedicated Unicast channel and at least one Multicast receiver dedicated to receiving Multicast transmissions via at least one dedicated Multicast channel co-located with the second fixed location VSAT terminal;

a first Unicast channel for transmission from said at least one satellite Unicast transponder to said first fixed location VSAT terminal;

a second Unicast channel for transmission from said at least one satellite Unicast transponder to said second fixed location VSAT terminal; and at least one Multicast channel for transmission from said at least one satellite Multicast transponder to said first fixed location VSAT terminal and to said second fixed location VSAT.

2. A system as recited in claim 1, including a very large network of fixed location, remotely located, VSAT terminals, each comprising at least one Unicast receiver.

3. A system as recited in claim 1, including a very large network of VSAT terminals, each comprising at least one Multicast receiver.

4. A system as recited in claim 2, wherein said VSAT terminals each comprises one Multicast receiver.

5. A system as recited in claim 1, wherein each Unicast channel transmits information to a plurality of VSAT terminals.

6. A system as recited in claim 1, wherein each Unicast channel transmits information to a plurality of VSAT terminals.

* * * * *